United States Patent
Guo et al.

(10) Patent No.: US 8,595,470 B2
(45) Date of Patent: Nov. 26, 2013

(54) DSP PERFORMING INSTRUCTION ANALYZED M-BIT PROCESSING OF DATA STORED IN MEMORY WITH TRUNCATION / EXTENSION VIA DATA EXCHANGE UNIT

(75) Inventors: Zhiyang Guo, San Jose, CA (US); Mao-Sung Wu, Taipei (TW); Chun Hsien, Taipei (TW); Tsai-Lin Lee, Taipei (TW)

(73) Assignee: Sentelic Corporation, Neihu Dist., Taipei (TW)

( * ) Notice: Subject to any disclaimer, the term of this patent is extended or adjusted under 35 U.S.C. 154(b) by 510 days.

(21) Appl. No.: 12/942,310

(22) Filed: Nov. 9, 2010

(65) Prior Publication Data
US 2011/0302391 A1    Dec. 8, 2011

(30) Foreign Application Priority Data
Jun. 2, 2010 (TW) .............................. 99210464 U

(51) Int. Cl.
*G06F 9/30* (2006.01)
*G06F 1/32* (2006.01)

(52) U.S. Cl.
USPC ............................ 712/220; 712/221; 713/324

(58) Field of Classification Search
None
See application file for complete search history.

(56) References Cited

U.S. PATENT DOCUMENTS

| | | | |
|---|---|---|---|
| 4,785,393 A * | 11/1988 | Chu et al. ...................... | 712/221 |
| 7,020,787 B2 * | 3/2006 | Takashima et al. ........... | 713/320 |
| 2002/0174319 A1 * | 11/2002 | Rivers et al. .................. | 712/200 |

* cited by examiner

*Primary Examiner* — Kenneth Kim
(74) *Attorney, Agent, or Firm* — Winston Hsu; Scott Margo

(57) ABSTRACT

A digital signal processor includes an instruction analysis unit, a digital signal processor (DSP) core and a memory unit. The instruction analysis unit receives an instruction and determines the required bit width M for the data process corresponding to the instruction. The DSP core performs the M-bit data process based on the bit width M determined by the instruction analysis unit, and the memory unit stores multiple data and performs the M-bit access based on the bit width M determined by the instruction analysis unit thereby allowing the DSP core to access, and at least one available space in the memory unit will be adjusted such that only the access space having the bit width M for the operation corresponding to the instruction will be open in each access, thereby effectively achieving the effect of power-saving.

4 Claims, 4 Drawing Sheets

DSP PERFORMING INSTRUCTION ANALYZED M-BIT PROCESSING OF DATA STORED IN MEMORY WITH TRUNCATION / EXTENSION VIA DATA EXCHANGE UNIT

This application claims the priority benefit of Taiwan patent application number 099210464 filed on Jun. 2, 2010.

BACKGROUND OF THE INVENTION

1. Field of the Invention

The present invention relates to a digital signal processor (DSP); in particular, the present invention relates to a DSP having the feature of power-saving.

2. Description of Related Art

In the era of information technology, demands for signal processing increase more and more. General-purpose processors usually are not capable of completing high-speed and complicated signal processing operations, therefore, the digital signal processor is developed to specifically deal with such tasks. The DSP is directed to performance of real-time operations on digitized signals; such operations may include signal filtering, mixing and comparing and the like.

The DSP can be not only programmable, but the in-field operation rate thereof may reach up to tens of millions of complex instructions per second which is far beyond the ability of commonly used microprocessors, playing a role of the critical chips in modern digitized electronic world. The conventional DSP also needs higher clocks in performing high-speed data processing, which may not only require massive amount of electricity, but power consumption must be much higher. In order to solve the above-said power consumption problem, the industry has made significant efforts to develop technologies enabling better power-saving effect in DSP.

Furthermore, currently available electronic applications mostly require portability and emphasize the ability to operate under a condition of limited power source; even for electronic products having stable power supply, and the demands on issues such as environment protection and power-saving are highlighted as well. Therefore, the technologies in the field of DSP have to advance toward low energy consumption.

In accordance with the prediction of Gene's Law, the trend regarding to energy consumption reductions in the DSP along the evolution of manufacture processes will augment one tenth in every 5 years. Actually, conventional DSP power-saving technologies are essentially based on dynamic adjustments on the operating clock and the operation voltage of the DSP; whereas, inasmuch as differences exist in various applications of the DSP, although switching the DSP among differing operating frequencies and voltages according to the DSP applications indeed reduces the power consumption, the effect thereof may be limited.

For example, currently available DSPs can be roughly categorized as 8-bit, 16-bit and 32-bit DSPs. When a 32-bit DSP receives an instruction for 16 bits, each of the components installed inside of such a DSP will start to run the instruction of 16-bit, however, the redundant components of the DSP never rest idle. Thus the aforementioned status causes unnecessary power consumption.

In brief, there are some disadvantages in the conventional technologies as follows:

1. Incapable of effectively controlling the number of transistors required while the DSP work.
2. Unable to arrange the resources precisely according to instruction and data.

In view of the above, what is desired is an improved DSP that is efficient and power-saving.

SUMMARY OF THE INVENTION

Accordingly, to effectively resolve such problems and defects described as above, the one objective of the present invention is to provide a digital signal processor featuring the efficiency.

Another objective of the present invention is to provide a digital signal processor may arrange the access capacity corresponding with binary codes of instructions or data.

Another objective of the present invention is to provide a digital signal processor, in addition to voltage and clock adapting, more effective use of the number of actuated transistors in order to further achieve lower power consumptions with better efficiency.

To successively complete the above-said objectives, the present invention provides a digital signal processor comprising: an instruction analysis unit, which receives an instruction and determines the number M of binary code(s) from the instruction; a DSP core, electrically connected to the instruction analysis unit which performs a M-bit process based on the number M of binary code(s) of the instruction analysis unit; and a memory unit, electrically connected to the which stores multiple data including the M-bit data accessed by the DSP core, thereby allowing the DSP core to access; additionally, through the number M of binary code(s) for the instruction determined by the instruction analysis unit, it is possible to cause the DSP core to perform the M-bit data process simply on the determined bit width M, while the rest hardware blocks irrelevant to the M-bit data process will not be supplied with voltages and clocks, thus effectively achieving the effect of power-saving.

DETAILED DESCRIPTION OF THE PREFERRED EMBODIMENTS

The above objectives and structural and functional features of the present invention will be described in more detail with reference to preferred embodiments thereof shown in the accompanying drawings. Embodiments of the invention are discussed below with reference to the FIGS. However, those skilled in the art will readily appreciate that the detailed description given herein with respect to these figures is for explanatory purposes as the invention extends beyond these limited embodiments.

Figure 1:
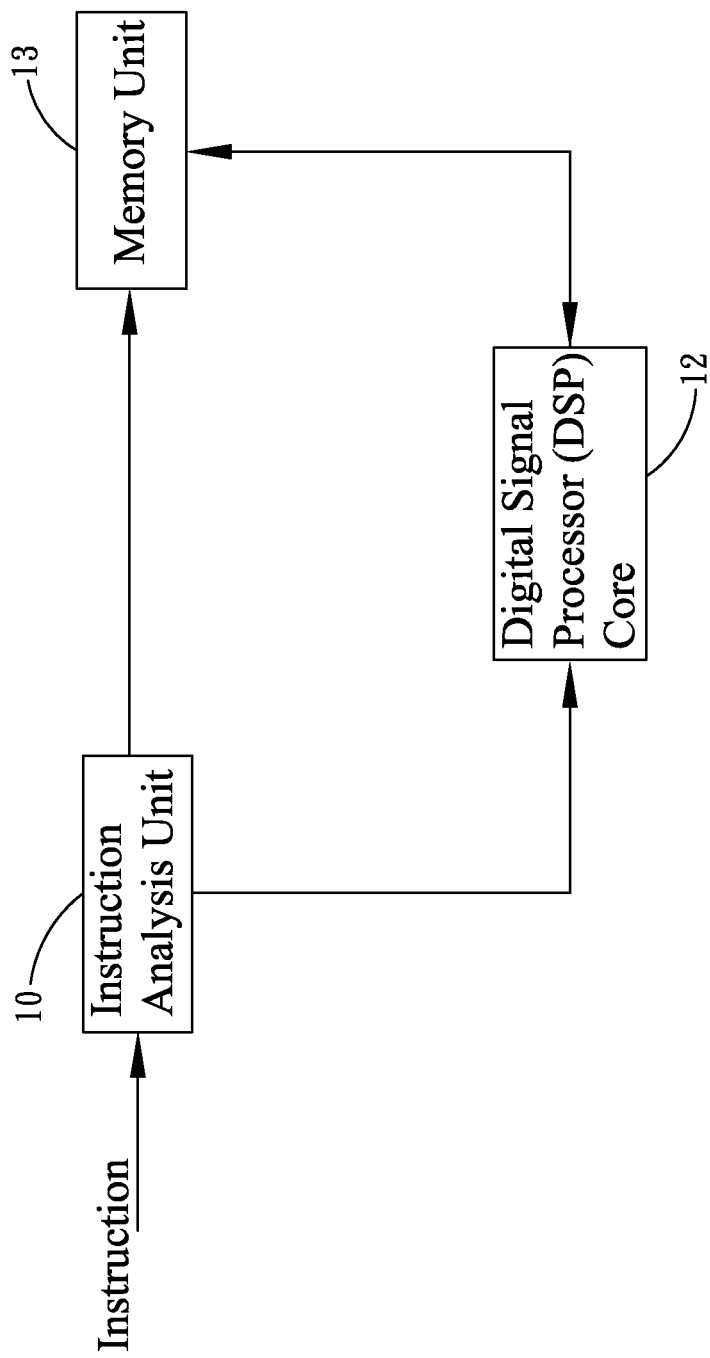
FIG. 1 is a block diagram for a preferred embodiment according to the present invention.

Please refer to FIG. 1, in which the present invention discloses a digital signal processor (abbreviated as DSP), and one preferred embodiment according to the present invention comprises an instruction analysis unit 10, a DSP core 12 and a memory unit 13, which instruction analysis unit 10 receiving an instruction and determining its length M-bit (e.g. figure out how many binary code in the instruction); that is, after reception of the instruction by the instruction analysis unit 10, it determines the number of binary codes from the instruction, hereinafter M-bit process; in case the analysis indicates that the instruction has a 20-bit in length, it can be appreciated that the 20-bit operation is needed to be executed later on, wherein M is an integer.

The DSP core 12 performs the M-bit process, and after the completion of the M-bit data process, it executes the next instruction or turn off at least one of the operating voltage or clock to wait for the next instruction; in other word, the DSP core 12 learns from the instruction analysis unit 10, for example, 20-bits as mentioned above, so that the DSP core 12 accordingly activates simply the appropriate hardware block (e.g. the number of transistors, not a limitation) for performing 20-bit data processing and then turn off the operating voltage or/and clock for the rest unused hardware blocks, thereby that, after completion of the M-bit process, the DSP core 12 proceed to executes the next instruction or turns off the operating voltage or/and the operating clock to wait for the next instruction, thus effectively achieving the effect of power-saving.

Figure 4A:
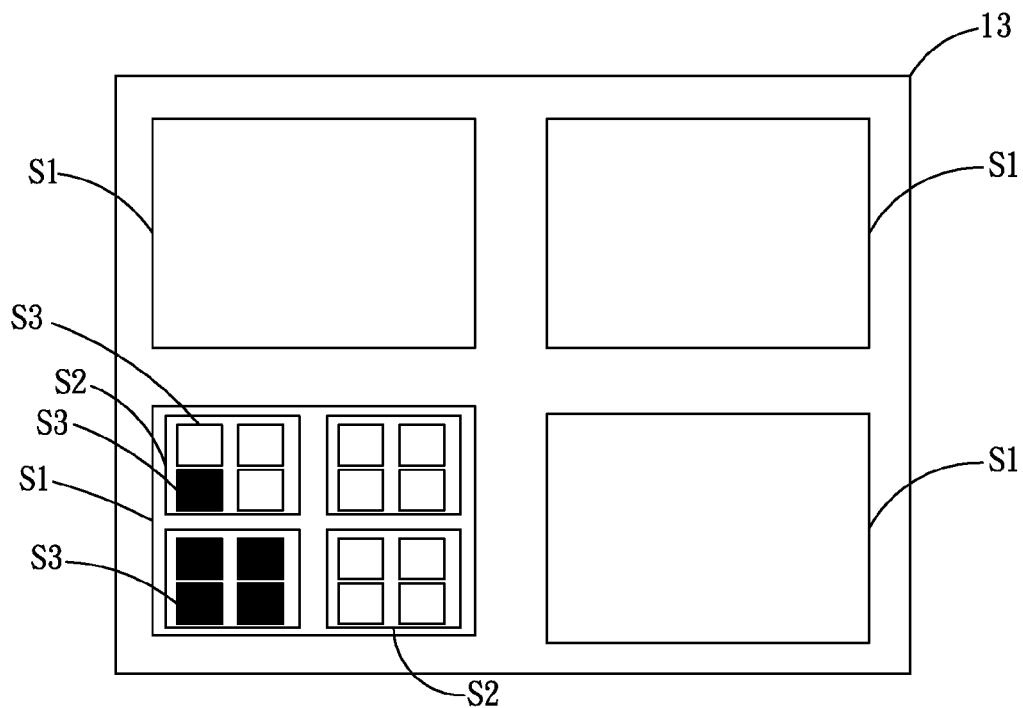
FIG. 4A is a block diagram for the memory unit of the preferred embodiment according to the present invention.
Figure 4B:
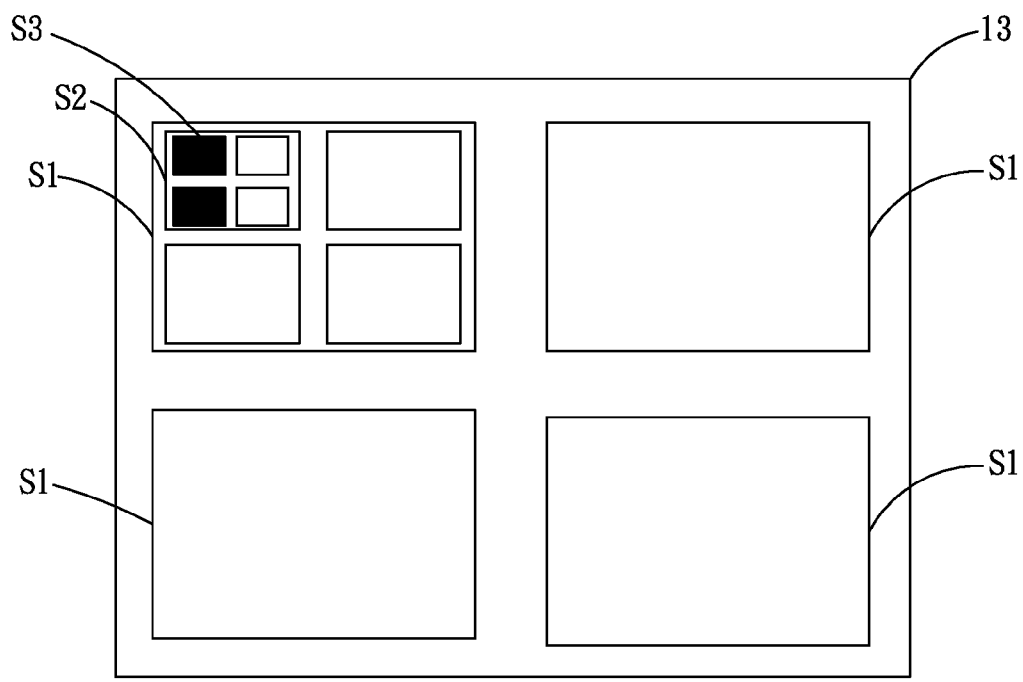
FIG. 4B is another block diagram for the memory unit of the preferred embodiment according to the present invention.

Please refer to FIGS. 1, 4A and 4B, wherein the memory unit 13 consists of a data memory and a data cache connected to the instruction analysis unit 10 and the DSP core 12, and said memory unit 13 stores multiple data and performs the M-bit access based on the determination from the instruction analysis unit 10. The approach to the access is that the memory unit 13 can only allow M-bit of data to input/output into itself, and the M-bit of data may be divided sequentially into a plurality of accessible area in a top-down way; for example, the maximum storage capacity of the memory unit 13 is 256 bits, which is possibly divided into four first sections 51 of 64-bit, with each first section S1 being possibly further divided into four second sections S2 of 16-bit, then each second sections S2 is again sub-divided into four third sections S3 of 4-bit.

As such, the memory unit 13 is simply enabled/dispatched said accessible area of 20 bits (i.e., to turn on one second sections S2 of 16-bit in a first section 51 of 64-bit and one third section S3 of 4-bit in another second sections S2 of 16-bit) for storage while the redundant (unused) accessible areas/sections of the memory unit 13 are disabled, which can be demonstrated with reference to FIG. 4A in which dark blocks indicate the access areas opened and blank blocks represent the rest redundant access spaces which are disabled.

Suppose said M is 7 (bits), then the memory unit 13 may be enabled an 8-bit accessible area (that is, to enable just two third sections S3 of 4-bit in one second section S2 of 16-bit within any one of the first section S1 (64-bit) for storage, and the rest unused accessible areas or/and sections are disabled, which can be demonstrated with reference to FIG. 4A in which dark blocks indicate the accessible areas or/and sections enabled and blank blocks represent the rest unused accessible areas or/and sections which are disabled; as a result, through the adjustment on the available accessible areas or/and sections in the memory unit 13 as described above, it is possible to achieve the objective of power-saving.

Additionally, the memory unit 13 may act to allow the DSP core 12 to saves or/and reads, which is that the memory unit 13 stores the Mbit data determined by the instruction analysis unit 10 such that the DSP core 12 saves or/and reads it.

Figure 2:
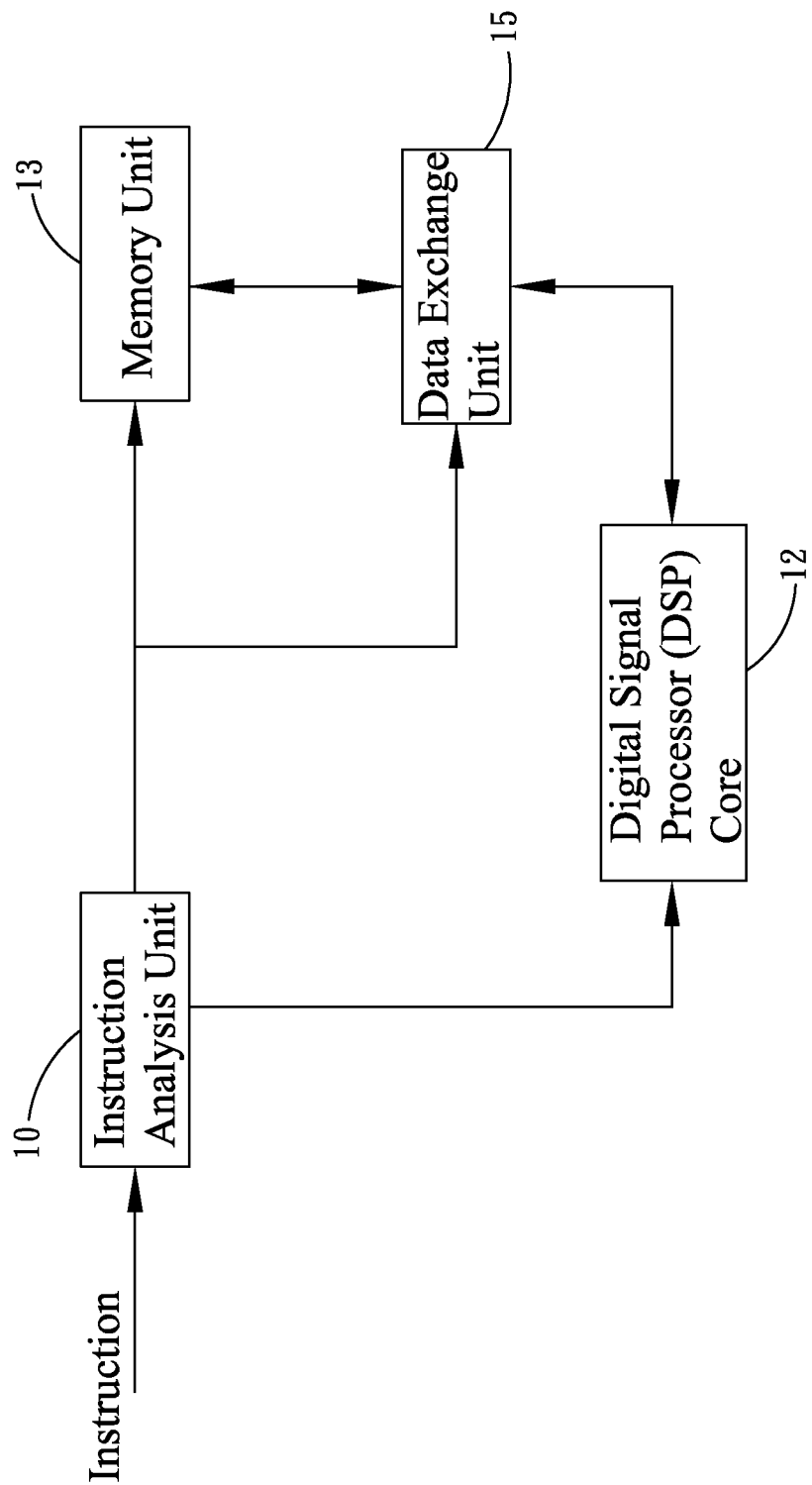
FIG. 2 is another block diagram for the preferred embodiment according to the present invention.
Figure 3:
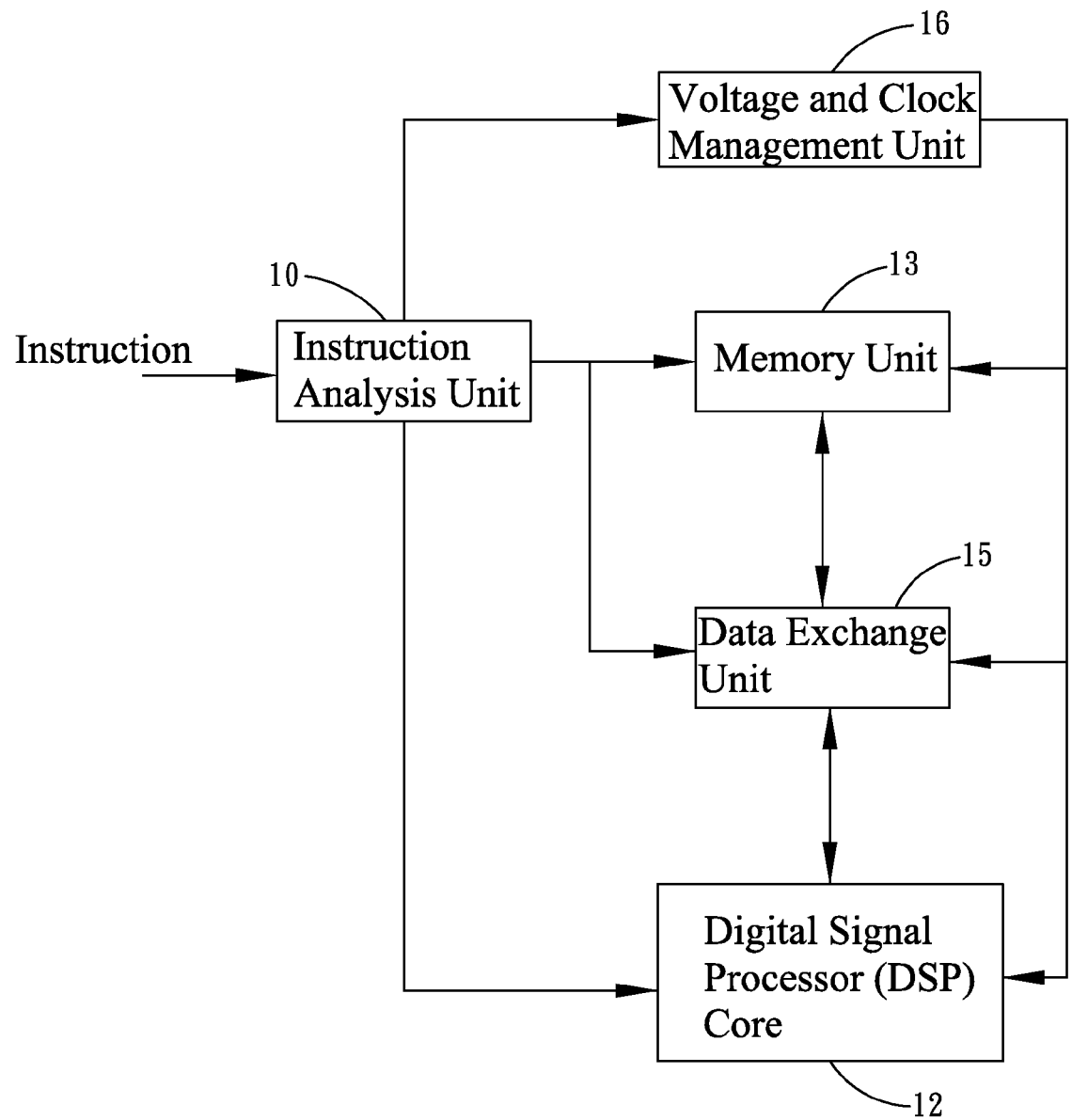
FIG. 3 is yet another block diagram for the preferred embodiment according to the present invention.

Refer next to FIGS. 2 and 3, wherein the DSP further comprises a data exchange unit 15 and a voltage and clock management unit 16, which data exchange unit 15 and a voltage and clock management unit 16 are electrically connected to the DSP core 12, the instruction analysis unit 10 and the memory unit 13, and performing data exchange between the DSP core 12 and the memory unit 13 based on the M-bit process (determined the value by the instruction analysis unit 10), e.g., the data exchange from 16-bit format to 20-bit format.

More specifically, at least one variable of P bit(s) stored by the memory unit 13, which is less than the data of M bit(s), the data exchange unit 15 performs a data extension of P to the same as M (bits). For example, after the DSP core 12 has sent the data of previous data process and stored it back in the memory unit 13, in case later on it is required to use the data with P (bits) in performing the 20-bit data process, the data of P-bit needs to be data transformed (extended) by the data exchange unit 15 from 16-bit into the 20-bit format and then passed it to the DSP core 12 for the 20-bit data process; as soon as the 20-bit data process is completed in the DSP core 12, the result of the process is then stored back in the memory unit 13.

Alternatively, at least one variable of Q bit(s) stored by the memory unit 13, which is greater than the data of M bit(s), the data exchange unit 15 performs a data truncation on the bit(s) of M to the same as Q (bit(s)). For example, after that the DSP core 12 has sent the data of previous operation (i.e., said Q, such as 24 bits) and stored it back in the memory unit 13, in case later on it is required to use the data with Q (bits) in performing the 16-bit (i.e., the M-bit) data process, the data of Q-bit will be transformed (trunked) by the data exchange unit 15 from 24-bit format into the 16-bit format and then passed it to the DSP core 12 for the 16-bit data process; as soon as the 16-bit data process is completed in the DSP core 12, the result of the process is then stored back in the memory unit 13.

As shown in FIG. 3, the voltage and clock management unit 16 mentioned earlier controls the voltage and clock to the memory unit 13, the data exchange unit 15 and the DSP core 12, respectively, in accordance with the value M determined by the instruction analysis unit 10, and the voltage and clock management unit 16 is also respectively connected to the instruction analysis unit 10, the memory unit 13, the data exchange unit 15 and the DSP core 12.

Besides, through a conjunctively integrated design of the instruction analysis unit 10, the DSP core 12 and the memory unit 13 according to the present invention, it is possible to execute the process of the same digit(s); hence, the DSP according to the present invention may provide a better operational flexibility in performing data processing, further effectively achieving the effect of power-saving.

In summary, compared with prior art, the present invention offers the following advantages:

1. The huge power-saving effect.
2. More flexible in performance of data process.

Whereas, the descriptions set forth hereinbefore illustrate merely the preferred embodiments of the present invention. All modifications, alternations or substitutions made by means of the methods, forms, structures and devices disclosed herein should be deemed as being encompassed by the scope of the present invention.

What is claimed is:

1. A digital signal processor, comprising:
   an instruction analysis unit which receives an instruction and determines a number M of bits of binary code(s) from the instruction;
   a DSP core electrically connected to the instruction analysis unit which performs an M-bit data process based on the number M of bits of binary code(s) of the instruction analysis unit;
   a memory unit electrically connected to the instruction analysis unit which stores multiple data including the M-bit data accessed by the DSP core to access; and a data exchange unit electrically connected to the DSP core, the instruction analysis unit, and the memory unit, the data exchange unit configured to truncate a first data stored in the memory to M-bits when the first data stored in the memory has more than M-bits and to extend a second data stored in the memory to M-bits when the second data stored in the memory has fewer than M-bits.

2. The digital signal processor according to claim 1, wherein the DSP core, after the completion of the M-bit data process, waits or turn off at least one of the operating voltage or the operating clock thereof.

3. The digital signal processor according to claim 1, further comprising the data exchange unit further configured to perform data exchange between the instruction analysis unit and the memory unit.

4. The digital signal processor according to claim 3, further comprising a voltage and clock management unit electrically connected to the instruction analysis unit, the memory unit, the data exchange unit and the DSP core respectively, the voltage and clock management unit configured to control the voltage and clock to turn off unused hardware blocks of the memory unit, the data exchange unit and/or the DSP core in accordance with the number of M-bits of binary code(s) determined by the instruction analysis unit.

* * * * *